(12) United States Patent
Murthy et al.

(10) Patent No.: US 10,860,304 B2
(45) Date of Patent: Dec. 8, 2020

(54) ENFORCEMENT OF UPDATES FOR DEVICES UNASSOCIATED WITH A DIRECTORY SERVICE

(71) Applicant: AirWatch LLC, Atlanta, GA (US)

(72) Inventors: Varun Murthy, Atlanta, GA (US); Kalyan Regula, Alpharetta, GA (US); Shravan Shantharam, Cumming, GA (US); Jason Roszak, Brookhaven, GA (US)

(73) Assignee: AIRWATCH LLC, Atlanta, GA (US)

( * ) Notice: Subject to any disclaimer, the term of this patent is extended or adjusted under 35 U.S.C. 154(b) by 195 days.

(21) Appl. No.: 14/923,848

(22) Filed: Oct. 27, 2015

(65) Prior Publication Data

US 2017/0115979 A1 Apr. 27, 2017

(51) Int. Cl.
*G06F 9/44* (2018.01)
*G06F 8/65* (2018.01)
*H04L 29/08* (2006.01)

(52) U.S. Cl.
CPC ............... *G06F 8/65* (2013.01); *H04L 67/16* (2013.01); *H04L 67/34* (2013.01)

(58) Field of Classification Search
CPC ........... G06F 8/65; H04L 67/16; H04L 67/34
USPC ........................................................ 717/171
See application file for complete search history.

(56) References Cited

U.S. PATENT DOCUMENTS

| | | | | |
|---|---|---|---|---|
| 6,167,567 A * | 12/2000 | Chiles | ..................... | G06F 9/454 717/173 |
| 6,990,660 B2 * | 1/2006 | Moshir | ..................... | G06F 8/62 709/223 |
| 7,158,965 B1 * | 1/2007 | Greenberg | ............. | G06F 9/453 |
| 7,590,981 B2 * | 9/2009 | Gupta | ..................... | G06F 8/658 717/168 |
| 7,630,381 B1 * | 12/2009 | Roskind | .................... | G06F 8/65 370/395.42 |
| 8,296,756 B1 * | 10/2012 | Feeser | ..................... | G06F 8/658 717/173 |
| 8,473,938 B1 * | 6/2013 | Feeser | ..................... | G06F 8/65 717/168 |
| 8,533,700 B1 * | 9/2013 | Feeser | ..................... | G06F 8/60 717/168 |
| 2002/0083438 A1 * | 6/2002 | So | ......................... | H04N 7/165 725/31 |
| 2003/0058277 A1 * | 3/2003 | Bowman-Amuah | ....................... | G06F 17/30607 715/765 |
| 2005/0068558 A1 * | 3/2005 | Wang | .................... | G06F 3/1204 358/1.13 |

(Continued)

OTHER PUBLICATIONS

Adrian Costea; "WSUS in a workgroup environment"; Adrian Costea's blog (NPL:Costea_2015.pdf; pp. 1-6) (Year: 2012).*

(Continued)

*Primary Examiner* — Hiren P Patel
(74) *Attorney, Agent, or Firm* — Thomas Horstemeyer, LLP

(57) ABSTRACT

Disclosed are approaches for enforcement of updates for devices unassociated with a directory service. An application executing on a computing device can determine, based on a policy received from a management service, that the computing device is to use an update service specified in the policy to receive updates. The application then modifies a setting of the computing device to specify the use of the update service by the computing device.

20 Claims, 3 Drawing Sheets

(56) References Cited

U.S. PATENT DOCUMENTS

| | | | | |
|---|---|---|---|---|
| 2005/0125560 A1* | 6/2005 | Brockway | ............ | H04L 63/0209 709/249 |
| 2006/0080656 A1* | 4/2006 | Cain | ............ | G06F 8/65 717/174 |
| 2008/0104705 A1* | 5/2008 | Hasbun | ............ | G06F 21/105 726/26 |
| 2008/0155534 A1* | 6/2008 | Boss | ............ | G06F 8/61 717/178 |
| 2010/0218235 A1* | 8/2010 | Ganot | ............ | H04L 41/0813 726/1 |
| 2011/0010569 A1* | 1/2011 | Obr | ............ | G06F 1/30 713/320 |
| 2011/0126192 A1* | 5/2011 | Frost | ............ | G06F 8/61 717/178 |
| 2012/0263074 A1* | 10/2012 | Paul | ............ | H04L 12/1485 370/254 |
| 2013/0185563 A1* | 7/2013 | Djabarov | ............ | G06F 9/44 713/176 |
| 2014/0032691 A1* | 1/2014 | Barton | ............ | H04L 41/00 709/206 |
| 2014/0109174 A1* | 4/2014 | Barton | ............ | H04W 12/08 726/1 |
| 2015/0058988 A1* | 2/2015 | Katz | ............ | H04L 63/1416 726/23 |
| 2016/0139738 A1* | 5/2016 | Wever | ............ | G06F 3/04847 715/810 |
| 2016/0259941 A1* | 9/2016 | Vasudevan | ............ | G06F 21/575 |
| 2016/0292428 A1* | 10/2016 | Brady | ............ | G06F 21/10 |
| 2017/0034213 A1* | 2/2017 | Murgia | ............ | H04L 63/02 |
| 2017/0034316 A1* | 2/2017 | Pei | ............ | H04B 3/54 |
| 2017/0060567 A1* | 3/2017 | Kim | ............ | G06F 8/65 |

OTHER PUBLICATIONS

Tech Notes Desk; "Deploy WSUS and manage clients without Active Directory" (NPL:TechNotes_Aug2015.pdf; pp. 1-3) (Year: 2015).*

L Garvin; "Configuring the Windows Update Agent"; (NPL:Garvin_2013.pdf; pp. 1-18) (Year: 2013).*

Microsoft Docs; "Configure Automatic Updates in Non-Active Directory Environment"; (MicrosoftDocs_2014.pdf; pp. 1-7) (Year: 2014).*

Rob Waugh; "WSUS Targeting for Non-Domain Computers"; Spiceworks, Feb. 25, 2015; (NPL:RobWaugh_2015.pdf; pp. 1-6) (Year: 2015).*

Erikviii; "Updating computer using WSUS without joining a domain" Spiceworks, Feb. 11, 2011; (NPL:Erikviii_2011.pdf; pp. 1-7) (Year: 2011).*

Dominic White et al.; "Microsoft Windows Server Update Services (WSUS) Review"; Rhodes University 2004; (White_2004.pdf; pp. 1-14) (Year: 2014).*

* cited by examiner

ENFORCEMENT OF UPDATES FOR DEVICES UNASSOCIATED WITH A DIRECTORY SERVICE

BACKGROUND

Updated versions of applications, device drivers, or the operating system of a computing device are often released over the life-cycle of a computing device. In some instances, multiple updates can be released during the life-cycle of a computing device. These updates can be downloaded and installed from a vendor's servers to a client device in order to update the applications or operating system of the computing device. However, using the automatic update option from a vendor suffers the drawback that an information technology (IT) department in a corporate setting cannot test the updates or control the install for employee devices.

To address this, some organizations can configure when and how updates are to be downloaded and installed onto a computing device. For example, an organization can use a Group Policy Object (GPO) to require that all devices connected or joined to a directory service or domain (e.g. a Microsoft Active Directory® domain) operated by the organization download and install updates from a central repository (e.g. Microsoft Windows Server Update Services®). This process, therefore, requires that the device to be updated is joined with a domain, typically, the employee's company, and obtain updates through the company domain instead of the vendor's servers. However, computing devices belonging to the organization that are not connected to, joined to, or otherwise enrolled or associated with the directory service or domain would be unable to download and install updates from the central repository. Further, an IT department would be unable to control update installations for non-domain devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for enforcing updates for devices that are unassociated with a directory service. A management agent on a user's device can communicate with a management service to enroll a client device with the management service. The management agent can download one or more policies for the client device specified by the management service. These policies can specify that the client device download or install updates from a particular update service other than a default service specified by an operating system of the client device. The management agent can then configure one or more settings of the client device to cause the client device to use the update service specified in the policy. For example, if a client device is running Microsoft Windows®, one or more registry values can be modified to cause the client device to download updates from a Windows Server Update Services (WSUS) server. Accordingly, a client can be configured to make use of a WSUS server without having to join an Active Directory domain.

Figure 1:
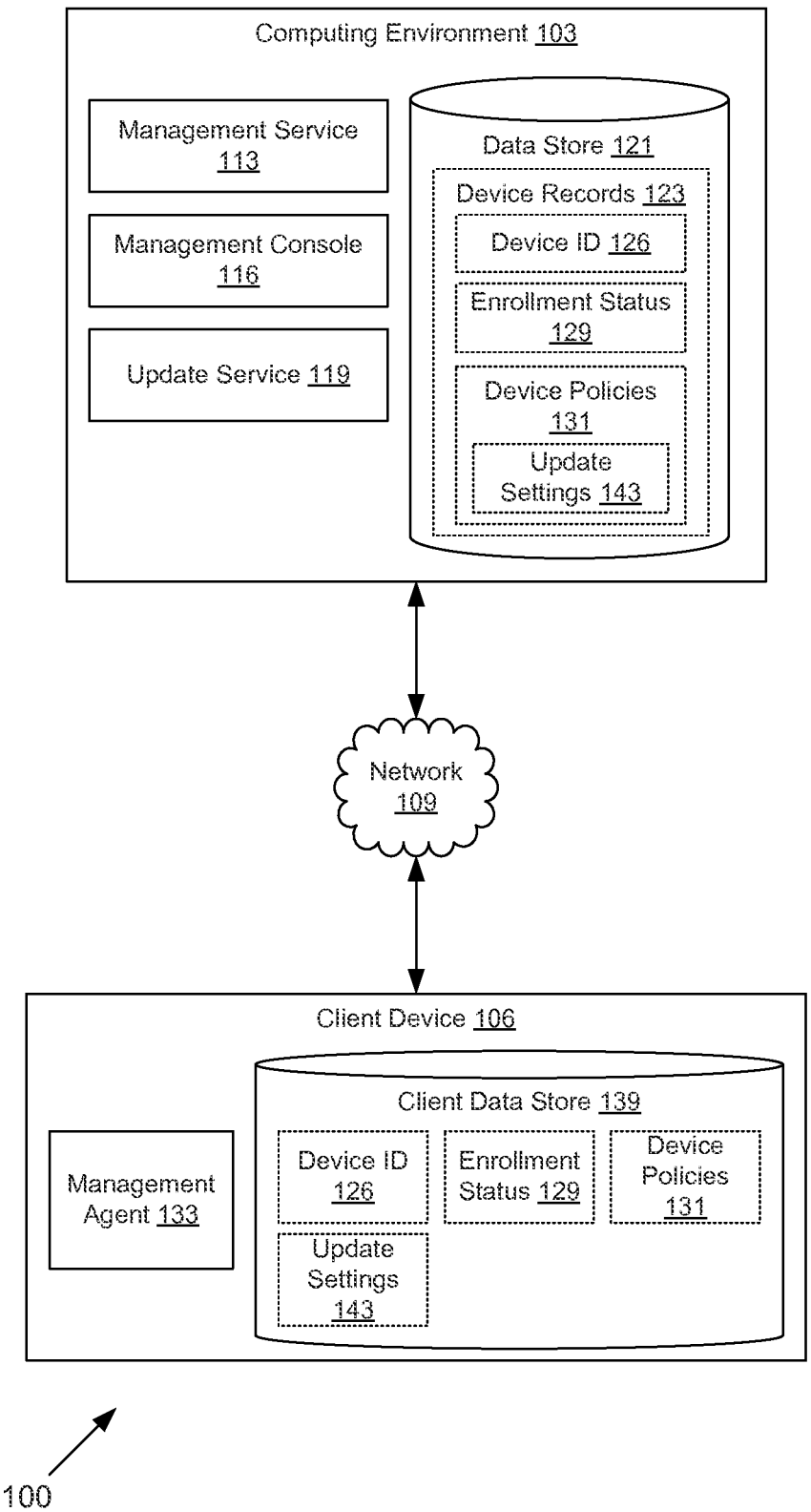
FIG. 1 is a schematic block diagram of a networked environment.

With reference to FIG. 1, shown is a networked environment 100 according to various examples. The networked environment 100 includes a computing environment 103, a client device 106, and potentially other devices, which are in data communication with each other over a network 109. The network 109 includes, for example, the Internet, intranets, extranets, wide area networks (WANs), local area networks (LANs), wired networks, wireless networks, or other suitable networks, or any combination of two or more networks. For example, the networks can include satellite networks, cable networks, Ethernet networks, and other types of networks.

The computing environment 103 can include a server computer or any other system providing computing capability. Alternatively, the computing environment 103 can employ a plurality of computing devices that can be arranged, for example, in one or more server banks, computer banks, or other arrangements. The computing devices can be located in a single installation or can be distributed among many different geographical locations. For example, the computing environment 103 can include a plurality of computing devices that together constitute a hosted computing resource, a grid computing resource, or any other distributed computing arrangement. In some cases, the computing environment 103 can correspond to an elastic computing resource where the allotted capacity of processing, network, storage, or other computing-related resources can vary over time. The components executed by the computing environment 103 can include a management service 113, a management console 116, an update service 119, and other applications, services, processes, systems, engines, or functionality not discussed in detail herein.

The management service 113 can administer the operation of various client devices 106 registered or otherwise enrolled with the management service 113. To this end, the management service 113 can require that particular applications to be installed on an enrolled client device 106, that the client device 106 to be configured in a particular manner, that particular features be enabled or disabled on the client device 106, or that particular settings be set to specified values, as is further described below.

The management console 116 can provide an administrative interface for configuring the operation of the management service 113 and the configuration of various client devices 106 that are administered by the management service 113. Accordingly, the management console 116 can correspond to a web page or web application provided by a web server hosted in the computing environment 103. In some instances, access to the management console 116 can be limited to particular users or user accounts, such as network or system administrators.

The update service 119 can provide a centralized distribution point for software updates for client devices 106. The update service 119 can download software updates for the operating system of a client device 106 and for one or more applications installed on the client device 106. These updates can include patches, hotfixes, service packs, device drivers, and similar updates. As an example, an update service 119 can correspond to an installation of Windows Server Update Services® (WSUS) provided by Microsoft® or similar services provided by other vendors.

By acting as a centralized distribution point for software updates, the update service 119 can control which software updates are made available to client devices 106 enrolled with the management service 113. For example, the update service 119 can make updates that are known to be incompatible with the operation of the management service 113 unavailable to enrolled client devices 106. In addition, the update service 119 can save on bandwidth in certain situations. For example, if multiple client devices 106 are located on the same LAN as the update service 119, the update service 119 only has to download an update once from the Internet. Multiple client devices 106 on the LAN can then download the update from the update service 119. This saves on bandwidth that would otherwise be consumed if each client device 106 separately downloaded the update from the Internet.

Also, various data is stored in a data store 121 that is accessible to the computing environment 103. The data store 121 can be representative of a plurality of data stores 121. The data stored in the data store 121, for example, can be associated with the operation of the various applications or functional entities described below. The data stored in the data store 121 can include, for example, one or more device records 123, a copy of the management agent 133, and potentially other data.

Device records 123 can represent information about client devices 106 that have been or are currently administered by the management service 113. For example, each client device 106 administered by the management service 113 can have at least one corresponding device record 123. A device record 123 can include a device identifier 126 for the corresponding client device 106, an enrollment status 129, and one or more applicable device policies 131.

A device identifier 126 can represent a unique identifier for the client device 106. For example, a device identifier 126 can include a serial number of the client device 106, a media access control (MAC) address of a network interface of the client device 106, a device fingerprint, or other identifier that can serve to uniquely identify the client device 106. In some instances, a device identifier 126 can include a combination of individual identifiers, such as a combination of a MAC address and a serial number.

The enrollment status 129 can represent the current status of the client device 106 with respect to the management service 113, such as "enrolled," "unenrolled," "pending," or similar enrollment statuses that reflect whether or to what extent a client device 106 is enrolled with the management service 113.

The device policies 131 represent one or more policies that are to be enforced for the client device 106 associated with the device record 123. Device policies 131 can include settings, permissions, or other configuration options that can be enforced when a client device 106 operates. For example, a device policy 131 can specify that a client device 106 receive updates from the update service 119. As another example, a device policy 131 can specify that the client device 106 only receive updates at certain times or on certain days. In some instances, the device policy 131 can specify that the client device 106 can only receive updates while the client device 106 is connected to particular networks 109 specified in the policy, such as trusted or preapproved LANs or Wi-Fi networks. In various instances, the device policy 131 can specify that use of the update service 119 is contingent on the enrollment status 129 of the client device 106. For example, the device policy 131 can specify that the client device 106 is only permitted to receive updates from the update service 119 if the enrollment status 129 indicates that the client device 106 has been enrolled or registered with the management service 113. In addition, a device policy 131 can specify the values for various update settings 143 of a client device 106, as further discussed below.

The client device 106 can represent one or more client devices 106 that can be coupled to the network 109. The client device 106 can correspond to a desktop computer, a laptop computer, personal digital assistants, cellular telephones, smartphones, set-top boxes, music players, web pads, tablet computer systems, game consoles, electronic book readers, or other devices with like capability. The client device 106 can include a display. The display can include one or more devices such as a liquid crystal display (LCD), gas plasma-based flat panel displays, organic light emitting diode (OLED) displays, electrophoretic ink (E ink) displays, LCD projectors, or other types of display devices.

The client device 106 can be configured to execute various applications, such as the management agent 133 or other applications. The management agent 133 can be executed in a client device 106 to enforce the device policies 131 specified for the client device 106. As an example, the management agent 133 can change settings to conform to those specified in the policies, such as settings related to the use of an update service 119. In some instances, the management agent 133 can be installed or configured to execute on the client device 106 with administrative privileges. For example, the management agent 133 can execute under the Administrator account on a client device 106 running Microsoft Windows® or the Root account on a client device 106 running a version of Linux® or Unix® (e.g., Apple's OSX® or iOS® operating systems). Moreover, the client device 106 can include a client data store 139 to cache or otherwise locally store the device identifier 126, enrollment status 129, device policies 131, and update settings 143.

The update settings 143 can represent one or more settings for the client device 106 governing how and from where the client device 106 is to download updates. As one example, an update setting 143 can specify whether to use an update service 119 or to download updates directly from the Internet. As another example, an update setting 143 can specify the types of updates (e.g. critical updates, security updates, operating system updates, application updates, or device driver updates) to be downloaded and installed. In various instances, the update setting 143 can specify whether updates are to be downloaded automatically and installed manually or downloaded and installed automatically. In some examples, the update setting 143 can also specify when or how frequently the client device 106 should check for available updates to download or install. In some instances, an update setting 143 can specify a uniform resource locator (URL) for the update service 119.

The update settings 143 can be stored on the client device 106 in various formats. In some examples, such as those instances where the client device 106 represents a device with a version of the Windows® operating system installed, the update settings 143 can be stored as one or more registry key-value pairs. In other examples, the update settings 143 can be stored as settings in a configuration file.

Next, a general description of the operation of the various components of the networked environment 100 is provided. To begin, an administrator can use the management console 116 to enable use of the update service 119 by registered or enrolled client devices 106. In some instances, the administrator can enable use of the update service 119 for specific client devices 106 or classes of client devices 106 enrolled with the management service 113. In other instances, the update service 119 can be enabled for all client devices 106 enrolled with the management service 113.

Various policy options related to the use of the update service 119 can also be configured through the management console 116. For example, an administrator can specify through the management console 116 that the update service 119 is to be used by the client device 106. An administrator can also specify through the management console 116 a URL for the update service 119. The administrator can also specify through the management console 116 limitations on the use of the update service 119. One limitation can restrict the types of updates to be downloaded from the update service 119. Another restriction can limit the use of the update service 119 to particular days or times of day. As another example of a restriction, access to the update service 119 can be restricted based on the network 109 that the client device 106 is connected to. In some instances, the enrollment status 129 of the client device 106 can be a basis for restricting or mandating access to the update service 119.

At some point after the device policy 131 is created, a management agent 133 executing on the client device 106 attempts to enroll a client device 106 with the management service 113. As part of the enrollment process, the management service 113 can create a device record 123 for the client device 106. The management service 113 can include a device identifier 126 for the client device 106, an enrollment status 129, and one or more device policies 131. The device policies 131 can include one or more device policies 131 related to the use of the update service 119. After enrollment is completed, the management agent 133 downloads the applicable device policies 131, which are listed in the device record 123 for the client device 106.

The management agent 133 can then modify one or more update settings 143 in order to cause the client device 106 to be in compliance with the device policies 131 related to use of the update service 119. For instance, the management agent 133 can change one or more update settings 143 to force the client device 106 to download updates from the update service 119 instead of from the Internet. As an example, if the client device 106 has a version of the Microsoft Windows operating system installed, the management agent 133 can modify the value for one or more of the following registry keys:

HKEY_LOCAL_MACHINE\SoftWare\MicroSoft\
  Windows\CurrentVersion\WindowsUpdate\Auto
  Update\IncludeRecommendedUpdates
HKEY_LOCAL_MACHINE\SoftWare\MicroSoft\
  Windows\CurrentVersion\WindowsUpdate\Auto
  Update\
HKEY_LOCAL_MACHINE\SoftWare\Policies\
  Microsoft\Windows\WindowsUpdate
HKEY_LOCAL_MACHINE\SoftWare\Policies\
  Microsoft\Windows\WindowsUpdate\AU
HKEY_LOCAL_MACHINE\SoftWare\Policies\
  Microsoft\Windows\WindowsUpdate\AU\
  WUStatusServer
HKEY_LOCAL_MACHINE\SoftWare\Policies\
  Microsoft\Windows\WindowsUpdate\AU\WUServer
HKEY_LOCAL_MACHINE\SoftWare\Policies\
  Microsoft\Windows\WindowsUpdate\AU\
  TargetGroupEnabled
HKEY_LOCAL_MACHINE\SoftWare\Policies\
  Microsoft\Windows\WindowsUpdate\AU\TargetGroup
HKEY_LOCAL_MACHINE\SoftWare\Policies\
  Microsoft\Windows\WindowsUpdate\AU\
  DisableWindowsUpdateAccess
HKEY_LOCAL_MACHINE\SoftWare\Policies\
  Microsoft\Windows\WindowsUpdate\AU\
  UseWUServer
HKEY_LOCAL_MACHINE\SoftWare\Policies\
  Microsoft\Windows\WindowsUpdate\AU\AUOptions
HKEY_LOCAL_MACHINE\SoftWare\Policies\
  Microsoft\Windows\WindowsUpdate\AU\
  RegisteredWithAU
HKEY_LOCAL_MACHINE\SoftWare\MicroSoft\
  Windows\CurrentVersion\WindowsUpdate\Services\
  7971f918-a847-4430-9279-4a52d1efe18d By modifying these registry keys, a client device 106 running Windows can be configured to use an update service 119, such as Windows Server Update Services or a similar update service 119, without having to join or be a member of a directory service, such as an Active Directory Domain. The management agent 133 can also make similar changes to the update settings 143 provided by other operating systems, such as modifying configuration files or configuration databases on the client device 106.

After modifying the updates settings 143 to configure the client device 106 to use the update service 119, the management agent 133 can continue to monitor the state of the client device 106 in order to determine if the client device 106 continues to comply with the device policies 131. If the management agent 133 determines that the client device 106 no longer complies with the device policy or policies 131, then the management agent 133 can take a corrective action. For example, if the management agent 133 determines that the update settings 143 have been changed to direct the client device 106 somewhere other than the update service 119, the management agent 133 can revert the changes to the update settings 143 so that the client device 106 can begin using the update service 119 again.

As another example, the management agent 133 can monitor the network 109 to which the client device 106 is connected. If the device policy 131 specifies that the client device 106 is prohibited from connecting to or using the update service 119 while connected to the current network 109, then the management agent 133 can modify one or more update settings 143 to disable use of the update service 119 by the client device 106. Once management agent 133 detects that the client device 106 has disconnected from the unauthorized network 109, the management agent 133 can modify the update settings 143 to enable use of the update service 119 by the client device 106.

In yet another example, the management agent 133 can monitor the current time and date and compare them to one or more device policies 131. If the current time or date falls within a period of time that a device policy 131 prohibits the client device 106 from using the update service 119, then the management agent 133 can modify one or more update settings 143 to disable use of the update service 119 by the client device 106. Once the management agent 133 determines that the current time or date falls outside of the period of time prohibited by the device policy 131, then management agent 133 can modify the update settings 143 to enable use of the update service 119 by the client device 106.

Figure 2:
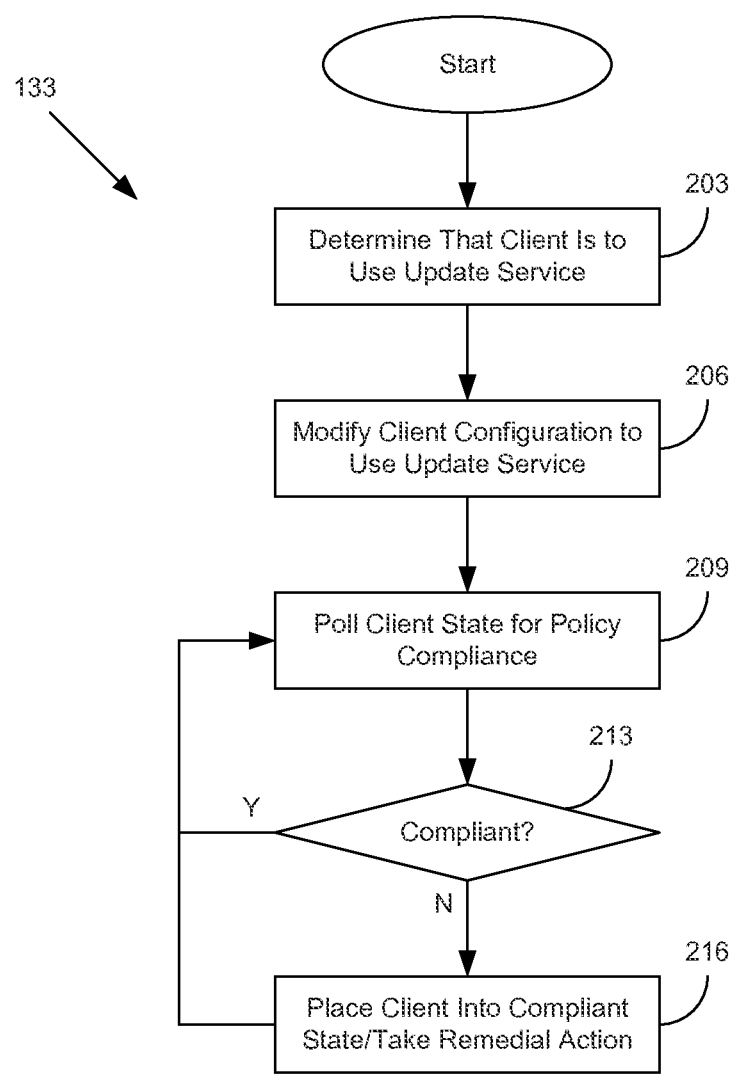
FIG. 2 is a flowchart depicting the operation of an application.

Referring next to FIG. 2, shown is a flowchart that provides one example of the operation of a portion of the management agent 133. As an alternative, the flowchart of FIG. 2 can be viewed as depicting an example of elements of a method implemented in the networked environment of FIG. 1.

Beginning with step 203, the management agent 133 can determine that the client device 106 on which the management agent 133 is installed is to use an update service 119 other than a default update service for the client device 106. For example, the management agent 133 can determine that a device policy 131 downloaded from a management service 113 specifies that the client device 106 is to use the update service 119 specified in the device policy 131.

Moving on to step 206, the management agent 133 can modify one or more update settings 143 of the client device 106 in order to cause the client device 106 to conform to the device policy 131. For example, if the client device 106 has a version of MICROSOFT WINDOWS installed, then the management agent 133 can modify the following registry keys to cause the client device 106 to use the update service 119 instead of Microsoft Windows Update®:
    HKEY_LOCAL_MACHINE\SoftWare\Policies\
        Microsoft\Windows\WindowsUpdate\AU\
        WUStatusServer
    HKEY_LOCAL_MACHINE\SoftWare\Policies\
        Microsoft\Windows\WindowsUpdate\AU\WUServer
In addition, the management agent 133 can modify the following registry key to prevent the management agent 133 from using Microsoft Windows Update:
    HKEY_LOCAL_MACHINE\SoftWare\Policies\
        Microsoft\Windows\WindowsUpdate\AU\
        DisableWindowsUpdateAccess
Similar settings can be modified if the client device 106 is using a different operating system.

Proceeding next to step 209, the management agent 133 can then poll the state of the client device 106 to determine whether the client device 106 continues to comply with one or more device policies 131 related to the use of the update service 119. For example, the management agent 133 can retrieve the update settings 143, the current date and time, the enrollment status 129, the current network 109 to which the client device 106 is connected, or other data at predefined intervals of time (e.g. every 5 seconds, every 30 seconds, every minute, every 5 minutes, or other interval). In some instances, the predefined interval of time can be defined by the device policy 131 specifying that the client device 106 use the update service 119. In other instances, the predefined interval of time can be a preconfigured setting of the management agent 133.

Referring next to step 213, the management agent 133 can determine whether the current state of the client device 106 complies with the device policies 131. Several examples of a compliance check are provided below. If the current state of the client device 106 does not comply with any one or more of the device policies 131, then the process proceeds to step 216. However, if the management agent 133 determines that the client device 106 is compliant with the applicable device policies 131, then the process loops back to step 209 and the management agent 133 continues to monitor the state of the client device 106.

As a first example, the management agent 133 can compare the current values of the update settings 143 to the values of the update settings 143 specified in a device policy 131. If the current values of the update settings 143 do not match the values specified in the device policy 131, the management agent 133 can determine that the update settings 143 have been changed, for example by a user or by another process or application, since the management agent 133 had configured the update settings 143 at step 206. Accordingly, the management agent 133 can determine that the client device 106 is no longer compliant with the device policy 131. However, if the current values of the update settings 143 match the values specified in the device policy 131, then the management agent can determine that the client device 106 remains in compliance with the device policy 131.

As a second example, the management agent 133 can identify the network 109 to which the client device 106 is connected. For example, the management agent 133 can recognize the media access control (MAC) address of the router for network 109 in order to distinguish or otherwise identify the network 109 from other networks 109. The management agent 133 can then compare the identity of the current network 109 to a list of networks specified in a device policy 131. If the device policy 131 did not identify the current network 109 as a network 109 from which the client device 106 was authorized to connect to the update service 119, then the management agent 133 can determine that the client device 106 was not in compliance with the device policy 131.

For instance, the device policy 131 can specify a blacklist of networks 109 from which connections to the update service 119 are prohibited. If current network 109 were included in the blacklist of networks 109, then the management agent 133 can determine that the client device 106 is not in compliance with the device policy 131. Likewise, if the current network 109 were not included in the blacklist of networks 109, then the management agent 133 can determine that the client device is in compliance with the device policy 131.

In other instances, the device policy 131 can specify a whitelist of networks 109 from which connections to the update service 119 are only allowed. If current network 109 were included in the whitelist of networks 109, then the management agent 133 can determine that the client device 106 is in compliance with the device policy 131. Likewise, if the current network 109 were not included in the whitelist of networks 109, then the management agent 133 can determine that the client device is not in compliance with the device policy 131.

As a third example, the management agent 133 can determine the current date and time and compare them to a time period specified in the device policy 131. If the current date and time did not fall within a period of time that the client device 106 is permitted to use the update service 119, then the management agent 133 can determine that the client device 106 fails to comply with the device policy 131.

For instance, a device policy 131 can list specific dates and times that the client device 106 is permitted to access the update service 119. If the current date and time fell outside the list of dates and times provided in the device policy 131, then the management agent 133 can determine that the client device 106 is unauthorized to use the update service 119. Likewise, if the current date and time fell within the list of dates and times provided in the device policy 131, then the management agent 133 can determine that the client device 106 is authorized to use the update service 119.

In other instances, a device policy 131 can list specific dates and times that the client device 106 is not permitted to access the update service 119. If the current date and time fell outside the list of dates and times provided in the device policy 131, then the management agent 133 can determine that the client device 106 is authorized to use the update service 119. Likewise, if the current date and time fell within the list of dates and times provided in the device policy 131, then the management agent 133 can determine that the client device 106 is unauthorized to use the update service 119.

As a fourth example, the management agent 133 can determine the current enrollment status 129 of the client device 106 and compare it to a value for the enrollment status 129 specified in the client device 106. If the current enrollment status 129 did not match an authorized enrollment status 129, the management agent 133 can determine that the client device 106 is not compliant with the device policy 131 and access to the update service 119 is unauthorized. For example, a device policy 131 can specify that only client device with a "registered," "enrolled," or similar enrollment status 129 is authorized to access the update service 119. If the client device 106 has an enrollment status 129 of "pending" or "unenrolled," then the management agent 133 can determine that the current state of the client device 106 failed to comply with the device policy 131.

Moving on to step 216, the management agent 133 can place the client device 106 into a compliant state or take some other remedial action. Several examples of how the management agent 133 can return the client device 106 to compliance, as well as other forms of remedial action, are provided below. Once the management agent 133 has returned the client device 106 to a compliant state, the process loops back to step 209 and the management agent 133 continues to monitor the state of the client device 106.

As a first example, the management agent 133 can change the update settings 143 to bring the client device 106 into compliance with the policy 131. For instance, the management agent 133 can read the value for each update setting 143 specified in the device policy 131 and change the corresponding update setting 143 on the client device 106 to match. In other instances, the management agent 133 can restore a compliant backup copy of the update settings 143.

As a second example, the management agent 133 can disable use of the update service 119 until the client device 106 returns to a compliant state. For instance, the management agent 133 can change one or more update settings 143 to disable access to the update service 119 until the client device 106 connects to a network 109 permitted by the device policy 131. Once the client device 106 connects to an authorized network 109, the management agent 133 can enable access to the update server 119 by changing the values of the update settings 143 back. In another instance, the management agent 133 can change one or more update settings 143 to disable access to the update service 119 until the current date and time fell within a time period in which the client device 106 is authorized to access the update service 119. In some instances, the management agent 133 can change one or more update settings 143 to disable access to the update service 119 until the enrollment status 129 of the client device 106 matches an enrollment status 129 for which use of the update service 119 is authorized.

Figure 3:
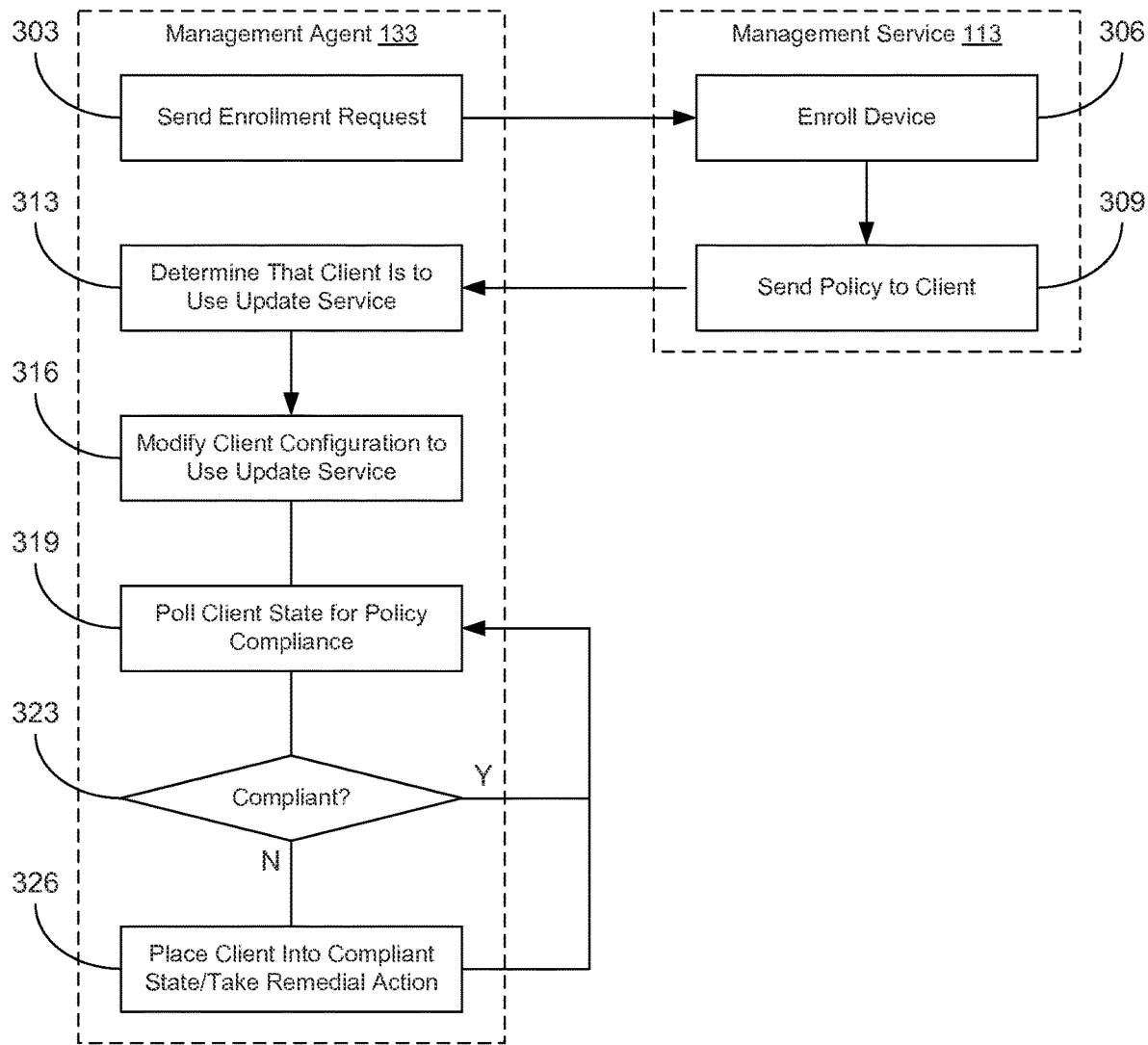
FIG. 3 is a sequence diagram depicting an interaction of various components.

FIG. 3 depicts a sequence diagram providing an example of the interactions between various portions of the management service 113 and the management agent 133. As an alternative, the sequence diagram of FIG. 3 can be viewed as depicting an example of elements of a method implemented in the networked environment of FIG. 1.

Beginning with step 303, the management agent 133 can send an enrollment request to the management service 113. The enrollment request can include a device identifier 126 and potentially other information about the client device 106 or the user of the client device 106.

Moving on to step 306, the management service 113 can proceed to enroll the client device 106 executing the management agent 133. For example, the management service 113 can create a device record 123 to represent the client device 106. The management service 113 can include the device identifier 126 provided by the client device 106 as part of the device record 123. The management service 113 can also include one or more device policies 131 in the device record 123. The device policies 131 can be default device policies 131 that have been selected as applicable to all client devices 106 or certain groups or classes of client devices 106 that include the enrolling the client device 106. Finally, the management service 113 can set the enrollment status 129 for the client device 106 as "registered," "enrolled," or a similar status.

Proceeding to step 309, the management service 113 can send one or more device policies 131 to the management agent 133. The device policies 131 sent to the management agent 133 can include the device policies 131 specified in the newly created device record 123. However, other device policies 131 can potentially be sent to the management agent 133 at this time as well. The management service 113 can also send the enrollment status 129 of the client device 106 to the management agent 133 at this step.

Referring next to step 313, the management agent 133 can determine that the client device 106 on which the management agent 133 is installed is to use an update service 119 other than a default update service for the client device 106. For example, the management agent 133 can determine that a device policy 131 downloaded from a management service 113 specifies that the client device 106 is to use the update service 119 specified in the device policy 131.

Moving on to step 316, the management agent 133 can modify one or more update settings 143 of the client device 106 in order to cause the client device 106 to conform to the device policy 131, as previously discussed for step 206. Proceeding to step 319, the management agent 133 can then poll the state of the client device 106 to determine whether the client device 106 continues to comply with one or more device policies 131 related to the use of the update service 119, as previously discussed d for step 209. Referring next to step 323, the management agent 133 can determine whether the current state of the client device 106 complies with the device policies 131, as previously discussed for step 209. Moving on to step 326, the management agent 133 can place the client device 106 into a compliant state or take some other remedial action, as previously discussed for step 216.

The flowchart of FIG. 2 and sequence diagram of FIG. 3 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 2 and sequence diagram of FIG. 3 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages can be added to the logical flow described herein, for purposes of enhanced utility, accounting, performance measurement, or troubleshooting aid. It is understood that all of these variations are within the scope of the present disclosure.

The computing environment 103 and the client device 106 or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The computing environment 103, the client device 106, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system, comprising:
a computing device that comprises a processor and a memory, and executes with the processor a version of the MICROSOFT WINDOWS operating system stored in the memory; and
an application comprising machine-readable instructions stored in the memory that, when executed by the processor, cause the computing device to at least:
receive a policy from a management service, the policy specifying an update service to be enforced;
determine that the computing device is unjoined to a domain that implements a version of the MICROSOFT ACTIVE DIRECTORY directory service;
determine that the computing device is to use the update service specified in the policy to receive and install updates to software installed on the computing device;
determine whether the computing device complies with the policy by periodically checking a WINDOWS registry key that causes the computing device to receive and install updates to software installed on the computing device;
force the computing device to use the update service based at least in part on modifying the WINDOWS registry key stored on the computing device in an instance in which the computing device does not comply with the policy;
determine that the update service is to be unavailable to the computing device at a time of day specified in the policy;
determine that a current time of day matches the time of day specified in the policy; and
cause the WINDOWS registry key stored on the computing device to be modified to disable use of the update service for the current time of day.

2. The system of claim 1, wherein the application further causes the computing device to at least:
revert a change to the WINDOWS registry key.

3. The system of claim 1, wherein the application further causes the computing device to at least:
determine that the update service is to be unavailable to the computing device when the computing device is connected to a network specified in the policy;
determine that the computing device is connected to the network specified in the policy; and
modify the WINDOWS registry key stored on the computing device to disable use of the update service.

4. The system of claim 1, wherein the application further causes the computing device to at least:
determine a current enrollment status of the computing device with the management service;
determine that the current enrollment status of the computing device is unauthorized by the policy; and
modify the WINDOWS registry key stored on the computing device to disable use of the update service.

5. The system of claim 1, wherein the update service is a version of the MICROSOFT WINDOWS SERVER update service.

6. The system of claim 1, wherein determining that the computing device is unjoined to the domain is based at least in part on the WINDOWS registry key being a first WINDOWS registry key and the application further causes the computing device to modify a second WINDOWS registry key to force the computing device to retrieve a type of update specified in the policy.

7. The system of claim 1, wherein the application further causes the computing device to at least:
determine that the WINDOWS registry key has been modified to allow use of another update service; and
revert the WINDOWS registry key stored on the computing device to force the computing device to use the update service.

8. A method, comprising:
receiving a policy from a management service, the policy specifying an update service to be enforced;
determining that a computing device is unjoined to a domain that implements a version of the MICROSOFT ACTIVE DIRECTORY directory service;
determining that the computing device is to use an update service specified in the policy to receive and install updates to software installed on the computing device;
determining whether the computing device complies with the policy by periodically checking a WINDOWS registry key that causes the computing device to receive and install updates to software installed on the computing device;
force the computing device to use the update service based at least in part on modifying the WINDOWS registry key stored on the computing device in an instance in which the computing device does not comply with the policy;
determining that the update service is to be unavailable to the computing device at a time of day specified in the policy;
determining that a current time of day matches the time of day specified in the policy; and
causing the WINDOWS registry key stored on the computing device to be modified to disable use of the update service for the current time of day.

9. The method of claim 8, further comprising:
reverting a change to the WINDOWS registry key.

10. The method of claim 8, further comprising
determining that the update service is to be unavailable to the computing device when the computing device is connected to a network specified in the policy;
determining that the computing device is connected to the network specified in the policy; and
modifying the WINDOWS registry key stored on the computing device to disable use of the update service.

11. The method of claim 8, further comprising:
determining a current enrollment status of the computing device with the management service;
determining that the current enrollment status of the computing device is unauthorized by the policy; and
modifying the WINDOWS registry key stored on the computing device to disable use of the update service.

12. The method of claim 8, wherein determining that the computing device is unjoined to the domain is based at least in part on the WINDOWS registry key being a first WINDOWS registry key and the method further comprises modifying a second WINDOWS registry key to force the computing device to retrieve a type of update specified in the policy.

13. The method of claim 8, further comprising:
determining that the WINDOWS registry key has been modified to allow use of another update service; and
reverting the WINDOWS registry key stored on the computing device to force the computing device to use the update service.

14. The method of claim 8, wherein the update service is a version of the MICROSOFT WINDOWS SERVER update service.

15. A non-transitory computer readable medium comprising machine readable instructions that, when executed by a processor of a computing device, cause the computing device to at least:
receive a policy from a management service, the policy specifying an update service to be enforced;
determine that the computing device is unjoined to a domain that implements a version of the MICROSOFT ACTIVE DIRECTORY directory service;
determine that the computing device is to use the update service specified in the policy to receive and install updates to software installed on the computing device;
determine whether the computing device complies with the policy by periodically checking a WINDOWS registry key that causes the computing device to receive and install updates to software installed on the computing device;
force the computing device to use the update service based at least in part on modifying the WINDOWS registry key stored on the computing device to force the computing device to use the update service in an instance in which the computing device does not comply with the policy;
determine that the update service is to be unavailable to the computing device at a time of day specified in the policy;
determine that a current time of day matches the time of day specified in the policy; and
cause the WINDOWS registry key stored on the computing device to be modified to disable use of the update service for the current time of day.

16. The non-transitory computer readable medium of claim 15, wherein the machine readable instructions further cause the computing device to at least:
revert a change to the WINDOWS registry key.

17. The non-transitory computer readable medium of claim 15, wherein the machine readable instructions further cause the computing device to at least:
determine that the update service is to be unavailable to the computing device when the computing device is connected to a network specified in the policy;
determine that the computing device is connected to the network specified in the policy; and
modify the WINDOWS registry key stored on the computing device to disable use of the update service.

18. The non-transitory computer readable medium of claim 15, wherein the machine readable instructions further cause the computing device to at least:
determine a current enrollment status of the computing device with the management service;
determine that the current enrollment status of the computing device is unauthorized by the policy; and
modify the WINDOWS registry key stored on the computing device to disable use of the update service.

19. The non-transitory computer readable medium of claim 15, wherein the machine readable instructions further cause the computing device to at least modify a second WINDOWS registry key to cause the computing device to retrieve a type of update specified in the policy.

20. The non-transitory computer readable medium of claim 15, wherein the update service is a version of the MICROSOFT WINDOWS SERVER update service.

* * * * *